United States Patent
Au et al.

(10) Patent No.: US 6,917,763 B1
(45) Date of Patent: Jul. 12, 2005

(54) TECHNIQUE FOR VERIFYING FIBER CONNECTIVITY IN A PHOTONIC NETWORK

(75) Inventors: How Kee Au, Ottawa (CA); Randy Kuang, Kanata (CA); Guo Qiang Wang, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 674 days.

(21) Appl. No.: 10/084,310

(22) Filed: Mar. 5, 2002

(51) Int. Cl.[7] ............................ H04B 10/08; H04B 10/00
(52) U.S. Cl. .......................... 398/166; 398/13; 398/16; 398/25
(58) Field of Search .................... 398/9, 10, 13, 398/16, 17, 25, 28, 30, 33, 140, 141, 166

(56) References Cited

U.S. PATENT DOCUMENTS 5,107,532 A * 4/1992 Hansen et al. ............... 379/25
5,394,503 A * 2/1995 Dietz et al. .................. 385/135
2002/0010843 A1 * 1/2002 Sanada et al. ............... 711/152
2002/0147802 A1 * 10/2002 Murotani et al. ........... 709/223

* cited by examiner

*Primary Examiner*—M. R. Sedighian
*Assistant Examiner*—Dzung Tran
(74) *Attorney, Agent, or Firm*—Hunton & Williams LLP

(57) ABSTRACT

A technique for verifying fiber connectivity via an optical supervisory channel in a photonic network is disclosed. In one embodiment, the technique is realized by sending a first message from the first node to the second node, wherein the first message includes an address of an intended port of the second node; receiving a second message at the first node from the second node in response to the first message, wherein the second message contains an address of a receiving port of the second node; and comparing the intended port of the second node and the receiving port of the second node for verifying fiber connectivity between the first node and the second node.

20 Claims, 5 Drawing Sheets

TECHNIQUE FOR VERIFYING FIBER CONNECTIVITY IN A PHOTONIC NETWORK

FIELD OF THE INVENTION

The present invention relates generally to fiber connectivity verification and, more particularly, to a technique for verifying fiber connectivity via an optical supervisory channel in a photonic network.

BACKGROUND OF THE INVENTION

A photonic (or optical) network generally refers to a communications network in which information is transmitted entirely in the form of optical signals. A great deal of time and effort is spent in the commissioning of a photonic network. The commissioning of a photonic network is particularly difficult in a network installation phase, as photonic network elements are interconnected by dark fibers. A dark fiber is an optical fiber that is currently installed but not being used. Optical fibers convey information in the form of light pulses. Therefore, dark fibers imply that no light pulses are being sent.

Generally, users (e.g., craft persons) follow instructions of network planners to interconnect nodes located approximately 20–30 kms apart. For example, a fiber link connected to port '1' of a node A is to be connected to port 'a' of a distant node B. The problem that may arise is whether users at node A and node B can be sure that they have each selected the same fiber from a bundle of fibers, or whether they have connected the fibers to the assigned ports at either end. Without a light source, establishment of correct fiber connectivity is labor intensive and time consuming.

In a Dense Wavelength Division Multiplexing (DWDM) photonic network, photonic network elements (e.g., nodes) may be interconnected by interconnecting fibers for transporting data carried by optical signals. These interconnecting fibers are dark fibers until they are lit by data carrying optical signals. The data carrying optical signals may be generated at an external peripheral or subscriber node. As such, the photonic network is transparent to the data carrying optical signals.

A dedicated channel may be embedded in each interconnecting fiber to enable nodes to exchange control and management messages. Such a designated channel may be known as an optical Supervisory Channel (OSC). Each OSC has a dedicated light source for transmitting optical signals from a source node to a destination node. In addition, each OSC has a dedicated optical detector in the source node to receive the return path optical signal from the destination node. An OSC unit may exist in each node to support electro-optics functionality and inter-nodal messaging capabilities. Thus, each interconnecting fiber may carry an OSC even though it is operating as a dark fiber for data traffic.

Interconnection of OSCs in a communication network forms an overlay network for control and management functionality. The OSCs may be Internet Protocol (IP) based where control and management functions in each node exchange information using IP messages.

For connectivity verification, a current verification method involves applying a light source at a first end of a fiber link. At a second end, a user is required to identify a specific fiber among a fiber bundle with a light signal from the light source, thereby identifying an end to end link. This link may then be connected to specific ports at either end. If there is a fiber cut in that link, the user at the second end will not be able to detect a light signal from any fiber in the fiber bundle. Thus, the user is not able to identify the correct fiber, or the user may select a wrong fiber from the fiber bundle. The process required to correct this predicament is time consuming and labor intensive.

Another current verification method involves interconnecting inter-nodal fibers and utilizing a built-in IP control plane (e.g., Open Shortest Path First (OSPF)) protocol to discover an inter-nodal fiber link topology. This process may yield a topology map for confirming the number of links interconnecting the nodes. However, the OSPF protocol does not associate the fiber links with their respective ports. Therefore, the OSPF protocol does not provide information to confirm proper fiber connectivity.

In view of the foregoing, it would be desirable to provide a technique for verifying fiber connectivity which overcomes the above-described inadequacies and shortcomings. More particularly, it would be desirable to provide a technique for verifying fiber connectivity in an efficient and cost effective manner.

SUMMARY OF THE INVENTION

According to the present invention, a technique for verifying fiber connectivity is provided. In one exemplary embodiment, the technique is realized by a method for verifying fiber connectivity between a first node and a second node comprises the steps of: sending a first message from the first node to the second node, wherein the first message includes an address of an intended port of the second node; receiving a second message at the first node from the second node in response to the first message, wherein the second message contains an address of a receiving port of the second node; and comparing the intended port of the second node and the receiving port of the second node for verifying fiber connectivity between the first node and the second node.

In accordance with other aspects of this exemplary embodiment of the present invention, the method further comprises a step of configuring a plurality of ports of the first node and a plurality of ports of the second node based on a fiber connectivity assignment map; the messages are exchanged via an optical supervisory channel between the first node and the second node; wherein one or more of the first node and the second node further comprises at least one light source for transmitting a light signal via the optical supervisory channel; wherein one or more of the first node and the second node further comprises at least one light detecting unit for detecting a light signal via the optical supervisory channel; the optical supervisory channel supports electro-optics functionality at one or more of the first node and the second node; the step of measuring at least one performance quality associated with the fiber link, wherein performance quality includes one or more of power loss and signal quality; and a step of activating an alarm when the intended port of the second node is different from the receiving port of the second node, wherein the alarm indicates a misconnection between the first node and the second node.

In accordance with other aspects of this exemplary embodiment of the present invention, a computer signal embodied in a carrier wave readable by a computing system and encoding a computer program of instructions for executing a computer process performing the method recited above.

In another exemplary embodiment of the present invention, a system for verifying connectivity of a plurality of fibers between a first node and a second node comprises a sending port of the first node for sending a first message from the first node to the second node, wherein the first message includes an address of an intended port of the second node; and a receiving port of the first node for receiving a second message at the first node from the second node in response to the first message, wherein the second message contains an address of the receiving port of the second node; wherein the intended port of the second node and the receiving port of the second node are compared for verifying fiber connectivity between the first node and the second node.

In accordance with other aspects of this exemplary embodiment of the present invention, a plurality of ports of the first node and a plurality of ports of the second node are configured based on a fiber connectivity assignment map; the messages are exchanged via an optical supervisory channel between the first node and the second node; wherein one or more of the first node and the second node further comprises at least one light source for transmitting a light signal via the optical supervisory channel; wherein one or more of the first node and the second node further comprises at least one light detecting unit for detecting a light signal via the optical supervisory channel; the optical supervisory channel supports electro-optics functionality at one or more of the first node and the second node; and an alarm indicating a misconnection between the first node and the second node is activated when the intended port of the second node is different from the receiving port of the second node.

In another exemplary embodiment of the present invention, an article of manufacture for verifying connectivity of a plurality of fibers between a first node and a second node comprises at least one processor readable carrier; and instructions carried on the at least one carrier; wherein the instructions are configured to be readable from the at least one carrier by at least one processor and thereby cause the at least one processor to operate so as to: send a first message from the first node to the second node, wherein the first message includes an address of an intended port of the second node; receive a second message at the first node from the second node in response to the first message, wherein the second message contains an address of a receiving port of the second node; and compare the intended port of the second node and the receiving port of the second node for verifying fiber connectivity between the first node and the second node.

In accordance with other aspects of this exemplary embodiment of the present invention, the messages are exchanged via an optical supervisory channel between the first node and the second node; one or more of the first node and the second node further comprises at least one light source for transmitting a light signal via the optical supervisory channel and at least one light detecting unit for detecting the light signal via the optical supervisory channel; the optical supervisory channel supports electro-optics functionality at one or more of the first node and the second node; and an alarm indicating a misconnection between the first node and the second node is activated when the intended port of the second node is different from the receiving port of the second node.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention provides a measurement and test technique that utilizes an embedded OSC of a photonic network where associated functions of the OSC in each node support a variety of measurement and test functions for dark fibers in a photonic network.

Figure 1:
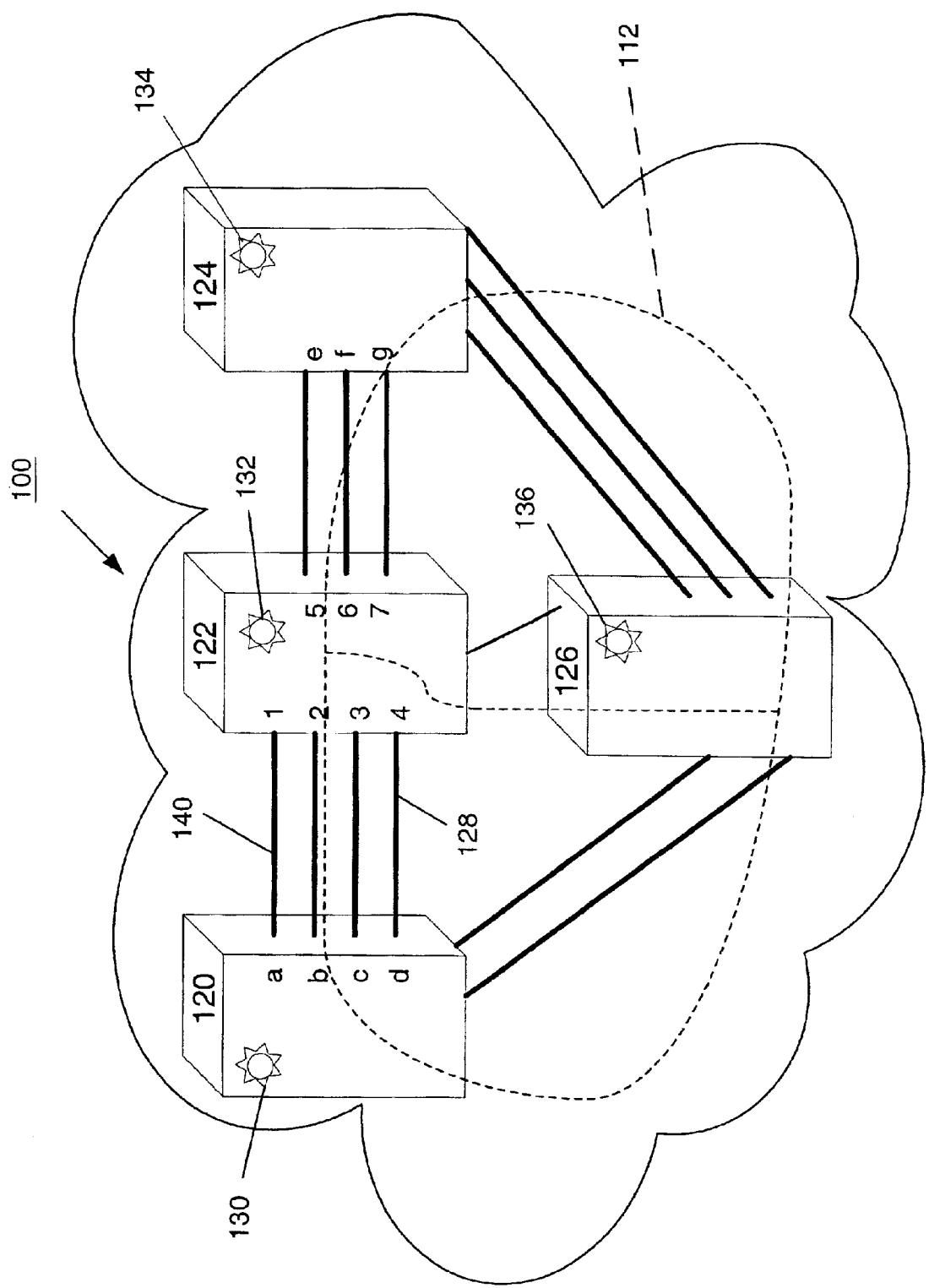
FIG. 1 is a system for verifying fiber connectivity in accordance with the present invention.

FIG. 1 is a photonic network 100 wherein fiber connectivity is verified in accordance with the present invention. The photonic network 100 comprises node 120, node 122, node 124 and node 126. At commissioning time, the nodes are interconnected with optical fibers, according to a specified plan. For example, port 'a' of node 120 is connected to port '1' of node 122 to form an inter-nodal fiber link via optical fiber 140. Also, port 'd' of node 120 is connected to port 4 of node 122 to form an inter-nodal fiber link via optical fiber 128, which may be specified as a protection link. Fiber connections must be established as specified because the operation of the network is dependant on proper fiber connectivity. At commissioning time, since there are no light sources, the optical fibers interconnecting the nodes are dark fibers, thereby making verification of proper connectivity difficult according to current technology.

In photonic network 100, an OSC exists in each inter-nodal fiber link. A logical connection of these OSCs is illustrated by 112. Each OSC provides inter-nodal communication functionality among nodes 120, 122, 124 and 126. Each node supports a light source, such as light source 130 at node 120; light source 132 at node 122; light source 134 at node 124 and light source 136 at node 126. Further, each OSC may support electro-optics functionality to enable information exchange between peer nodes. The present invention is directed to verifying fiber connectivity between nodes via the OSC.

An OSC light source (e.g., 130, 132, 134, 136) may be available when a node (e.g., 120, 122, 124, 126) is switched on. As such, control and management functions of each node may exchange information via an OSC with neighboring peer nodes. The present invention efficiently uses the OSC light sources and supports communication channel functions to address current problems with existing techniques.

Figure 2:
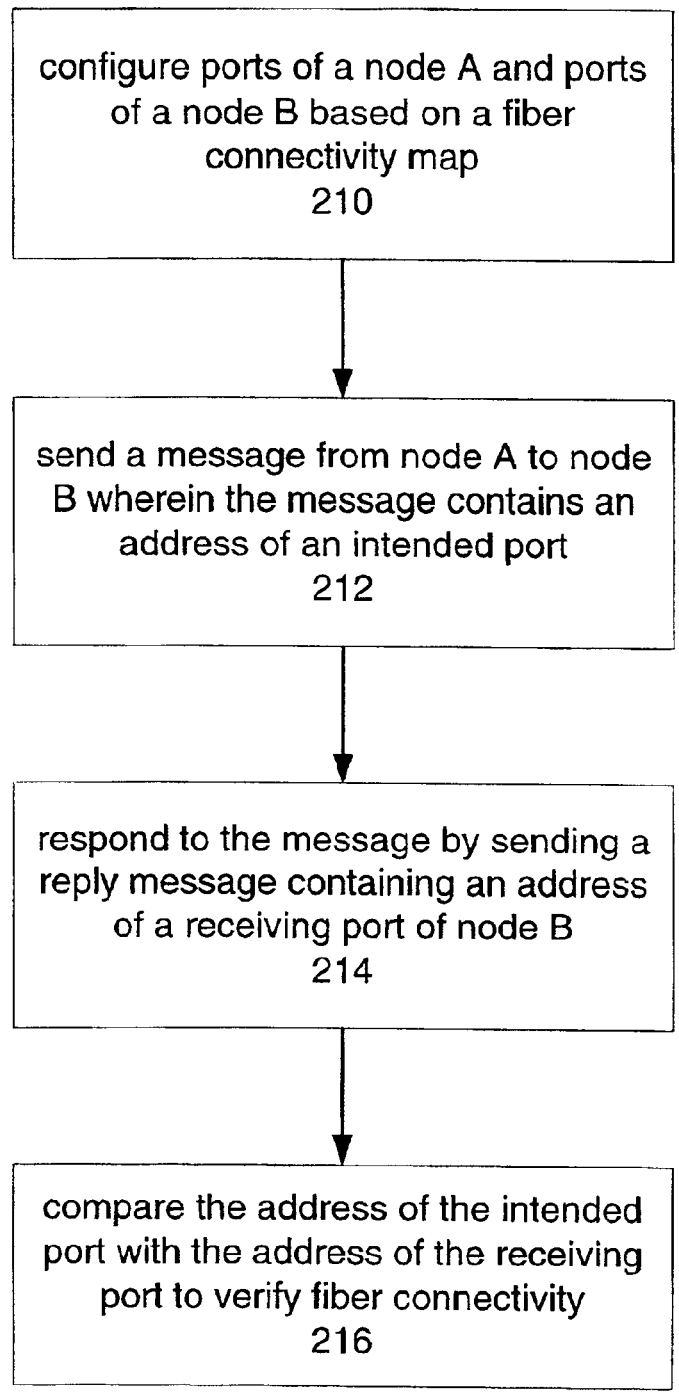
FIG. 2 is a flowchart illustrating a method for verifying fiber connectivity in accordance with the present invention.

FIG. 2 is a flowchart illustrating a method for verifying fiber connectivity in accordance with the present invention. At step 210, prior to connecting fibers between a first node A and a second node B, a plurality of ports at node A and a plurality of ports at node B are configured. Information for connecting the plurality of ports at node A and the plurality of ports at node B may be obtained from a fiber connectivity assignment map, at either node. For example, the fiber connectivity assignment map may indicate that a port '1' of node A is to be connected to port 'a' of node B, and so on.

At step 212, node A may send a message to node B, where the message identifies the port of the fiber termination (e.g., the message contains an address of an intended port of node B). At step 214, node B may respond to the message by sending a reply message containing an address of the port receiving the message at node B, to node A. At step 216, the address of the intended port may be compared with the address of the receiving port to verify proper connectivity. If the addresses are the same, proper connectivity has been verified. If the addresses are different, an alarm or other warning of a misconnection may be activated.

Alarms may be raised if node B has identified an address which is not in the fiber connectivity assignment map. If there is such a misconnection, the sending node A will not receive a response from node B at the specified port. Instead, node A may receive a response from node B at a different port in node A, if all inter-nodal fibers are connected. After a specified time-out period, node A may conclude that connectivity is in error when an unexpected response appears in a different port, the fiber has a breakage when there is no response at all, or other defect has occurred. As well, node B is aware that the message from node A has arrived at a port contrary to the fiber connectivity assignment map. The errors detected at either node facilitate error correction, thereby enabling users to take immediate action and respond accordingly.

Figure 3:
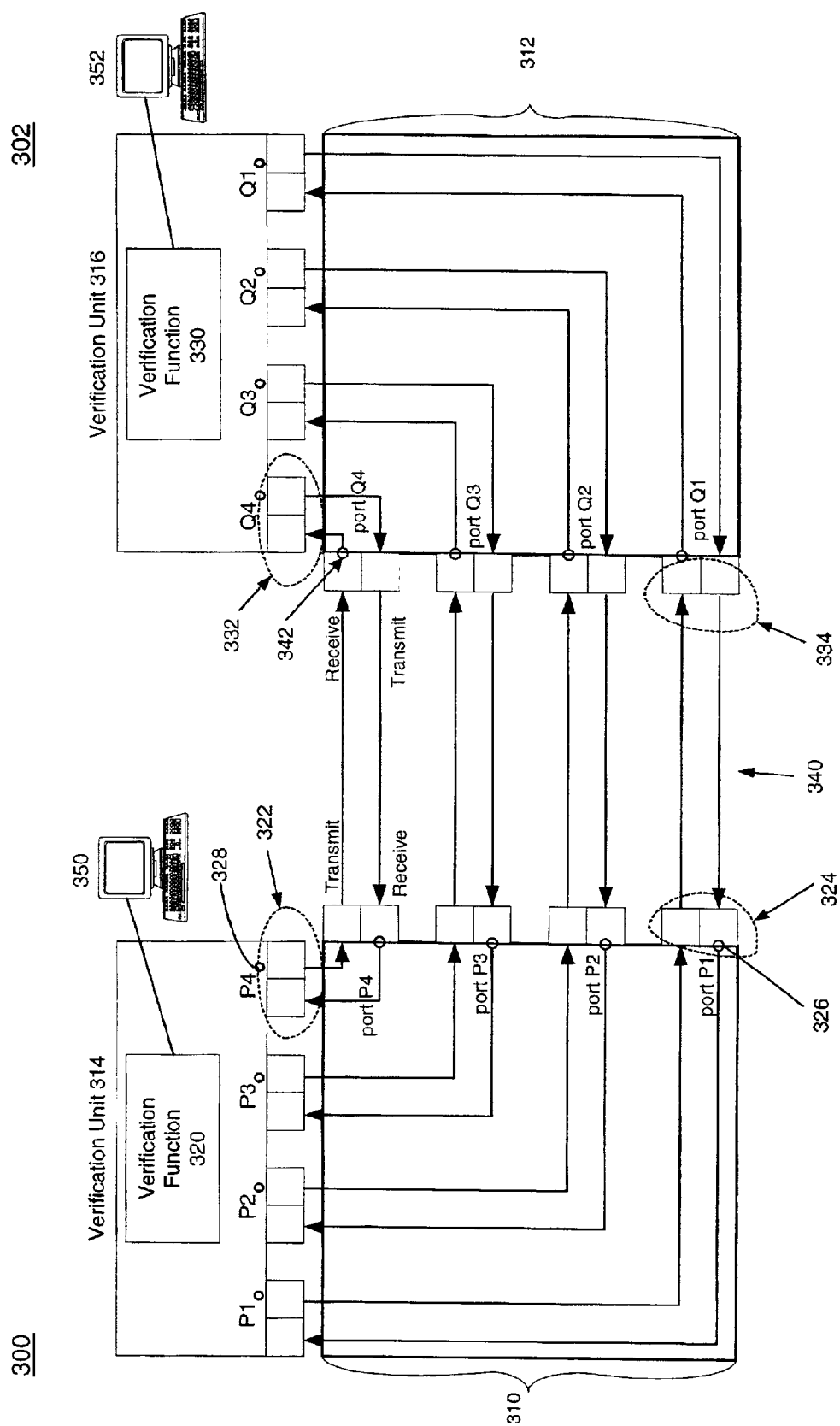
FIG. 3 is a system supporting a verification process in accordance with the present invention.

FIG. 3 is a system supporting a verification process in accordance with the present invention. Each photonic cross connect (e.g., 310, 312) supports a verification unit (e.g., 314, 316). The verification unit may contain a verification function (e.g., 320, 330), communications terminations (e.g., 322, 332), and data ports (e.g., 324, 334). Verification functions 320, 330 verify fiber connectivity between nodes 300 and 302. Communication terminations 322, 332 support electro-optics functionality through which verification function 320 sends and receives messages to and from verification function 330 of a node 302, for example. Data ports (e.g., 324, 334) support an OSC light source power detection unit (e.g., 326) for indicating status of fiber link 340. An OSC light source unit (e.g., 328) may provide a light signal from a port of a node (e.g., portP4) to a receiving port (e.g., portQ4) of a peer node (e.g., 302) where the light signal may be detected at a remote OSC light source power detection unit (e.g., 342) for verifying a connection.

The plurality of ports for nodes 300 and 302 may be configured according to a fiber connectivity assignment map.

In this example, P1 to P4, portP1 to portP2, . . . , Q1 to Q4, portQ1 to portQ4 may be configured where P1 is associated with portP1, P2 is associated with portP2, etc. A fiber connectivity assignment map may specify that P1 (portP1) must be connected to Q1 (portQ1); P2 (portP2) must be connected to Q2 (portQ2); P3 (portP3) must be connected to Q3 (portQ3); and P4 (portP4) must be connected to Q4 (portQ4).

After the ports of each node are configured, either node may initiate the verification function (e.g., 320, 330) to send messages to a peer node via each fiber link. The verification functions 320, 330 may be initiated by a user device, such as computer 350, 352, respectively. The verification function at both nodes may verify the connectivity and identify fiber failure conditions instantly and automatically. Thus, users at either end may take immediate action to rearrange fiber connections, flag the fiber failure conditions or respond otherwise.

Figure 4:
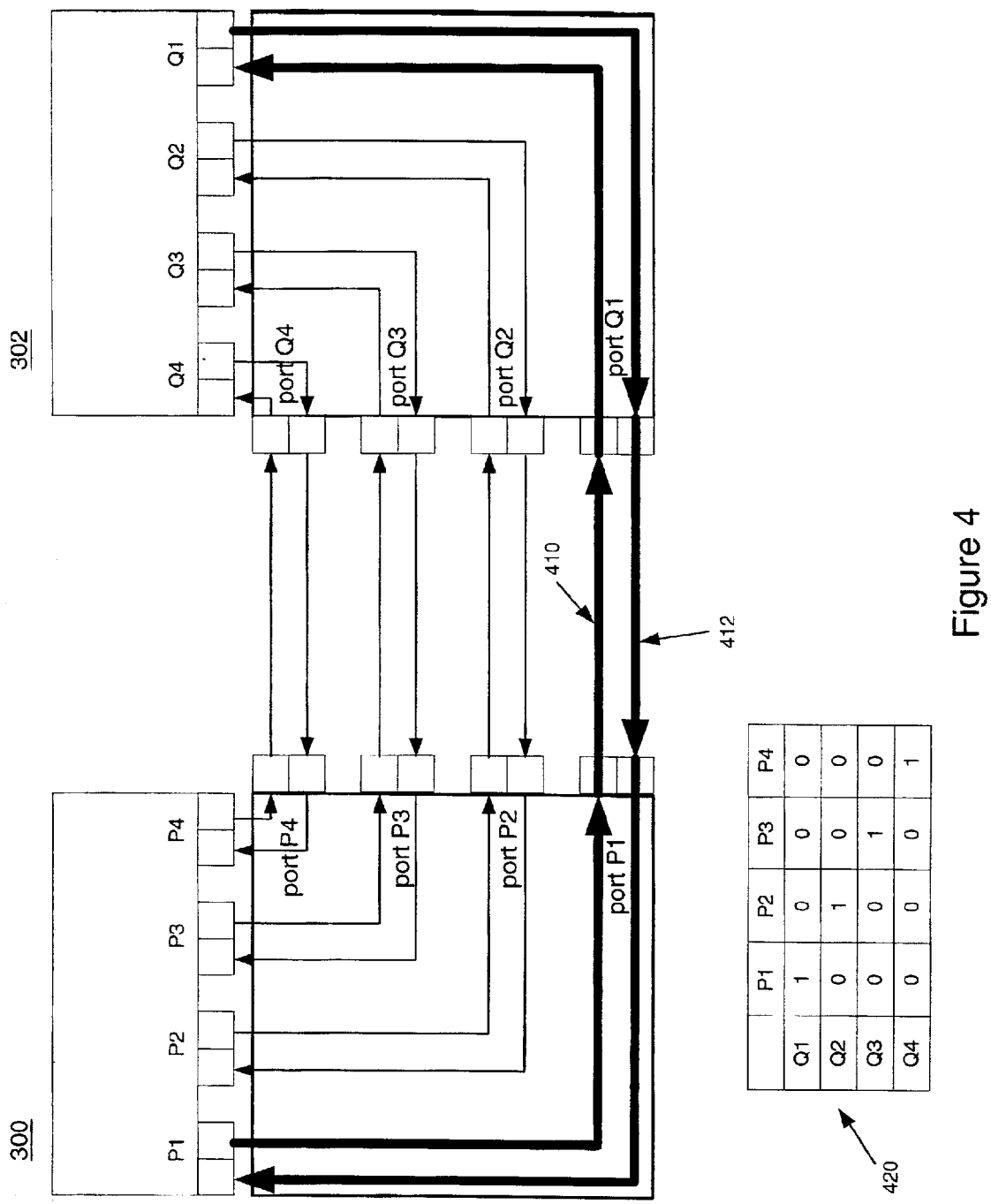
FIG. 4 is a system supporting a verification process where a connection is correct in accordance with the present invention.

FIG. 4 is a system supporting a verification process where a connection is correct in accordance with the present invention. At node 300, P1 identifies portP1 as a transmitting port and portQ1 as a receiving port of node 302. PortP1 then transmits address information (e.g., port identifiers, such as portP1 and portQ1) across fiber link 410 to portQ1. The address information is transmitted from portQ1 to Q1. At Q1, the address information received may be compared with connectivity data from fiber connectivity assignment map 420. At node 302, portQ1 is identified as the receiving port and portP1 is identified as the transmitting port, which is verified by fiber connectivity assignment map 420.

At node 302, Q1 identifies portQ1 as a responding port and portP1 as a receiving port of node 300. PortQ1 then transmits address information (e.g., port identifiers, such as portQ1 and portP1) across fiber link 412 to portP1. The address information is transmitted from portP1 to P1. At P1, reply address information is compared with connectivity data from fiber connectivity assignment map 420. At node 300, portP1 is identified as the receiving port and portQ1 is identified as the responding port, which is verified by fiber connectivity assignment map 420. Thus, proper connectivity is verified between portP1 and portQ1.

Figure 5:
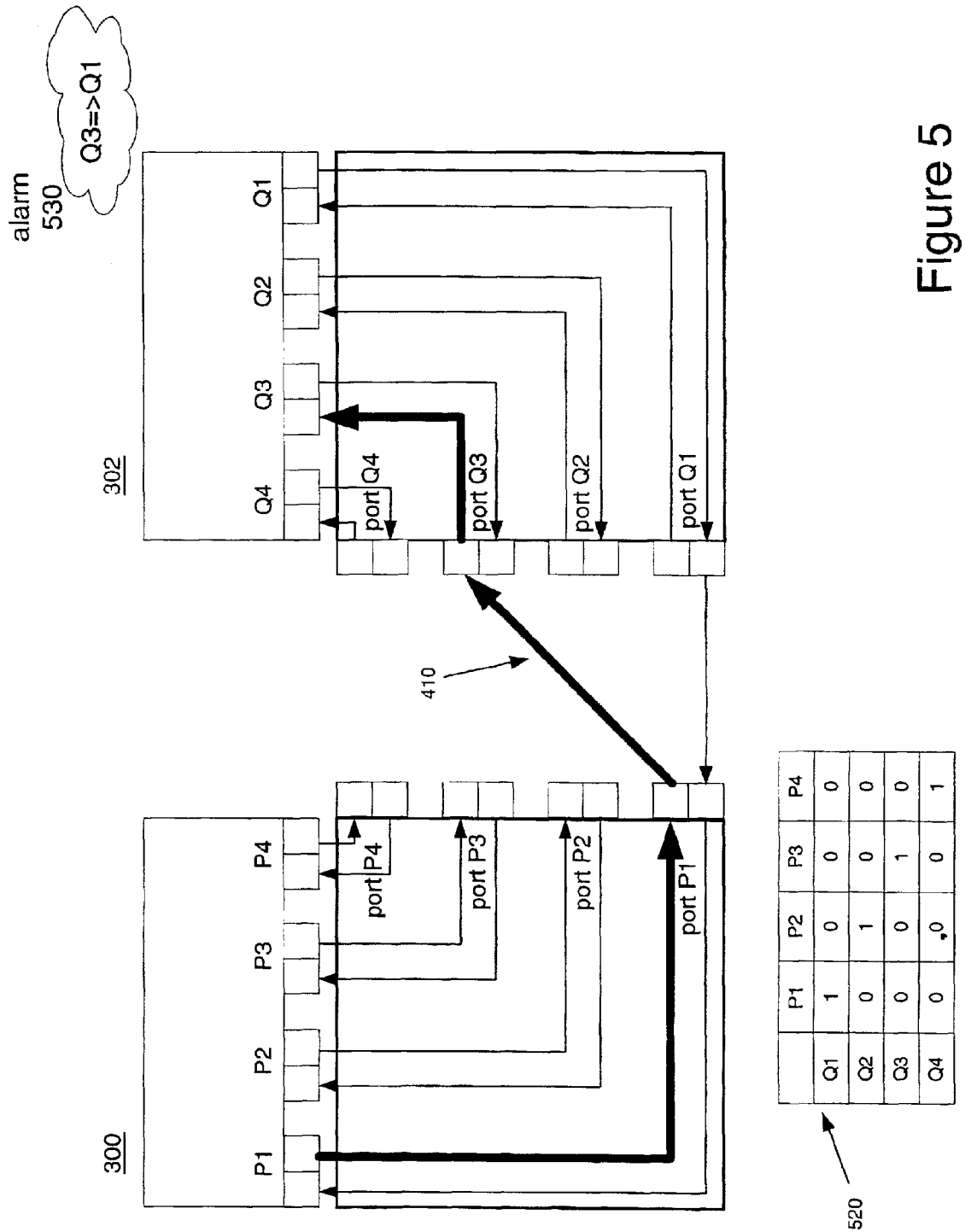
FIG. 5 is a system supporting a verification process where a connection is incorrect in accordance with the present invention.

FIG. 5 is a system supporting a verification process where a connection is incorrect in accordance with the present invention. At node 300, P1 identifies portP1 as a transmitting port and portQ1 as a receiving port of node 302. PortP1 then transmits address information (e.g., port identifiers, such as portP1 and portQ1) across fiber link 410 to node 302. The address information is transmitted from portQ3 to node 302. At Q3, the address information received may be compared with connectivity data from fiber connectivity assignment map 520. At node 302, portQ3 is identified as the receiving port and portP1 is identified as the transmitting port. According to fiber connectivity assignment map 520, when portP1 is a transmitting port, portQ1 should be the receiving port. When this is not the case, an alarm may be signaled. In this example, an alarm 530 that indicates that Q3 should be replaced by Q1 for proper connectivity is activated. Therefore, the present invention detects the failure and further localizes the precise fiber link with the failure.

The verification function of the present invention involves detecting and localizing a fiber link failure. For example, each node may detect a loss of signal of a distant light source during normal modes of operation and determine a cause of the loss of signal, which may include a fiber cut, light source failure or other defect. In response, a loss of signal alarm may be activated. Therefore, the user at either end will have an immediate view of the status of received signals thereby identifying the failure conditions.

At this point it should be noted that verifying fiber connectivity in accordance with the present invention as described above typically involves the processing of input data and the generation of output data to some extent. This input data processing and output data generation may be implemented in hardware or software. For example, specific electronic components may be employed in an optical node or similar or related circuitry for implementing the functions associated with verifying fiber connectivity in accordance with the present invention as described above. Alternatively, one or more processors operating in accordance with stored instructions may implement the functions associated verifying fiber connectivity in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for verifying fiber connectivity between a first node and a second node, the method comprising the steps of:
   sending a first message from the first node to the second node, wherein the first message includes an address of an intended port of the second node;
   receiving a second message at the first node from the second node in response to the first message, wherein the second message contains an address of a receiving port of the second node; and
   comparing the intended port of the second node and the receiving port of the second node for verifying fiber connectivity between the first node and the second node.

2. The method of claim 1, further comprising a step of:
   configuring a plurality of ports of the first node and a plurality of ports of the second node based on a fiber connectivity assignment map.

3. The method of claim 1, wherein the messages are exchanged via an optical supervisory channel between the first node and the second node.

4. The method of claim 3, wherein one or more of the first node and the second node further comprises at least one light source for transmitting a light signal via the optical supervisory channel.

5. The method of claim 3, wherein one or more of the first node and the second node further comprises at least one light detecting unit for detecting a light signal via the optical supervisory channel.

6. The method of claim 3, wherein the optical supervisory channel supports electro-optics functionality at one or more of the first node and the second node.

7. The method of claim 1, further comprising a step of:
   activating an alarm when the intended port of the second node is different from the receiving port of the second node, wherein the alarm indicates a misconnection between the first node and the second node.

8. A computer signal embodied in a carrier wave readable by a computing system and encoding a computer program of instructions for executing a computer process performing the method recited in claim 1.

9. A system for verifying connectivity of a plurality of fibers between a first node and a second node, the system comprising:
   a sending port of the first node for sending a first message from the first node to the second node, wherein the first message includes an address of an intended port of the second node; and
   a receiving port of the first node for receiving a second message at the first node from the second node in response to the first message, wherein the second message contains an address of the receiving port of the second node;
   wherein the intended port of the second node and the receiving port of the second node are compared for verifying fiber connectivity between the first node and the second node.

10. The system of claim 9, wherein a plurality of ports of the first node and a plurality of ports of the second node are configured based on a fiber connectivity assignment map.

11. The system of claim 9, wherein the messages are exchanged via an optical supervisory channel between the first node and the second node.

12. The system of claim 11, wherein one or more of the first node and the second node further comprises at least one light source for transmitting a light signal via the optical supervisory channel.

13. The system of claim 11, wherein one or more of the first node and the second node further comprises at least one light detecting unit for detecting a light signal via the optical supervisory channel.

14. The system of claim 11, wherein the optical supervisory channel supports electro-optics functionality at one or more of the first node and the second node.

15. The system of claim 9, wherein an alarm indicating a misconnection between the first node and the second node is activated when the intended port of the second node is different from the receiving port of the second node.

16. An article of manufacture for verifying connectivity of a plurality of fibers between a first node and a second node, the article of manufacture comprising:
   at least one processor readable carrier; and
   instructions carried on the at least one carrier;
   wherein the instructions are configured to be readable from the at least one carrier by at least one processor and thereby cause the at least one processor to operate so as to:
   send a first message from the first node to the second node, wherein the first message includes an address of an intended port of the second node;
   receive a second message at the first node from the second node in response to the first message, wherein the second message contains an address of a receiving port of the second node; and
   compare the intended port of the second node and the receiving port of the second node for verifying fiber connectivity between the first node and the second node.

17. The article of manufacture of claim 16, wherein the messages are exchanged via an optical supervisory channel between the first node and the second node.

18. The article of manufacture of claim 17, wherein one or more of the first node and the second node further comprises at least one light source for transmitting a light signal via the optical supervisory channel and at least one light detecting unit for detecting the light signal via the optical supervisory channel.

19. The article of manufacture of claim 17, wherein the optical supervisory channel supports electro-optics functionality at one or more of the first node and the second node.

20. The article of manufacture of claim 16, wherein an alarm indicating a misconnection between the first node and the second node is activated when the intended port of the second node is different from the receiving port of the second node.

* * * * *